United States Patent
Kralik et al.

(10) Patent No.: US 11,128,114 B2
(45) Date of Patent: Sep. 21, 2021

(54) HAZARD DETECTION SYSTEM FOR PORTABLE ELECTRICAL DEVICES

(71) Applicant: Western Technology, Inc., Bremerton, WA (US)

(72) Inventors: Michael Kralik, Salt Lake City, UT (US); Alfred Neufeld, Salt Lake City, UT (US); Brandon McLellan, Salt Lake City, UT (US)

(73) Assignee: Western Technology, Inc., Bremerton, MA (US)

( * ) Notice: Subject to any disclaimer, the term of this patent is extended or adjusted under 35 U.S.C. 154(b) by 236 days.

(21) Appl. No.: 16/189,775

(22) Filed: Nov. 13, 2018

(65) Prior Publication Data

US 2020/0153225 A1 May 14, 2020

(51) Int. Cl.
| | |
|---|---|
| H02H 5/00 | (2006.01) |
| H02H 1/00 | (2006.01) |
| H02H 3/08 | (2006.01) |
| G01P 15/18 | (2013.01) |
| H02H 11/00 | (2006.01) |
| F21L 4/00 | (2006.01) |
| H02H 5/04 | (2006.01) |

(52) U.S. Cl.
CPC .......... *H02H 1/0007* (2013.01); *F21L 4/005* (2013.01); *G01P 15/18* (2013.01); *H02H 3/08* (2013.01); *H02H 5/04* (2013.01); *H02H 11/006* (2013.01)

(58) Field of Classification Search
CPC ...... H02H 5/04; H02H 11/006; H02H 1/0007; H02H 3/08; F21L 4/005; G01P 15/18
See application file for complete search history.

(56) References Cited

U.S. PATENT DOCUMENTS

| | | |
|---|---|---|
| 6,681,814 B1 | 1/2004 | Bartlett et al. |
| 7,055,417 B1 | 6/2006 | Gass |
| 7,075,195 B2 | 7/2006 | Feil |
| 7,644,645 B2 | 1/2010 | Gass et al. |

(Continued)

FOREIGN PATENT DOCUMENTS

| | | | | |
|---|---|---|---|---|
| CN | 101958110 A | * | 1/2011 | ............. G09G 3/006 |
| CN | 102496864 A | | 6/2012 | |

(Continued)

*Primary Examiner* — Matthew V Nguyen
*Assistant Examiner* — Jye-June Lee
(74) *Attorney, Agent, or Firm* — Thorpe, North & Western, LLP (57) ABSTRACT

A power control apparatus can include a power circuit configured to transfer power to a load circuit. The apparatus can also include one or more environmental sensors configured to register environmental data including at least one of movement, hazardous gas, environmental temperature, environmental moisture, and collision data associated with the apparatus. The apparatus can also include a power controller circuit operatively connected to the one or more environmental sensors and the power circuit, the power controller circuit being configured to receive the environmental data from the one or more environmental sensors, determine whether the received environmental data exceeds a predetermined threshold, and in response to determining that the received environmental data exceeded a predetermined threshold, interrupting supply of power from the power circuit to the load circuit.

24 Claims, 5 Drawing Sheets

(56) References Cited

U.S. PATENT DOCUMENTS

| | | |
|---|---|---|
| 7,725,137 B2 | 3/2010 | Lee |
| 8,316,547 B2 | 11/2012 | Hecht et al. |
| 8,826,726 B2 | 9/2014 | Schmid et al. |
| 9,600,998 B2 | 3/2017 | Mumey |
| 9,601,915 B2 | 3/2017 | Santana |
| 2002/0101173 A1* | 8/2002 | Tsai ................. G09G 3/298 315/169.3 |
| 2005/0122650 A1 | 6/2005 | Beasley, III et al. |
| 2005/0154936 A1* | 7/2005 | Nagai ................. G11B 5/5582 714/5.11 |
| 2006/0215299 A1* | 9/2006 | Kao ................. G11B 5/5582 360/69 |
| 2007/0226557 A1* | 9/2007 | Fuseya ................. G11C 5/147 714/724 |
| 2011/0199219 A1* | 8/2011 | Smith ................. A62B 99/00 340/604 |
| 2012/0133218 A1* | 5/2012 | Fujii ................. H04M 1/72569 307/116 |
| 2012/0279742 A1 | 11/2012 | Roser |
| 2016/0320361 A1 | 11/2016 | Johansen |
| 2017/0330446 A1 | 11/2017 | Thurlow et al. |

FOREIGN PATENT DOCUMENTS

| | | |
|---|---|---|
| IN | 2477DEL2015 | 2/2007 |
| IN | 1757DEL2007 | 4/2009 |
| IN | 201611011071 | 1/2018 |
| WO | WO 2011/124224 A1 | 10/2011 |
| WO | WO 2015/000492 A1 | 1/2015 |

\* cited by examiner

HAZARD DETECTION SYSTEM FOR PORTABLE ELECTRICAL DEVICES

BACKGROUND

The possibility of electricity arcing or sparking exists whenever an electrical device using a power source is connected to a load. Sparking and arcing can occur when damage occurs to the power source, the load device, or a connection between the two. Any arcing or sparking becomes even more dangerous when it occurs in combustible or otherwise explosive environments. Accordingly, there is a continuing need for electrical devices that can minimize the chance of electrical sparking or arcing when an electrical device is damaged or compromised.

SUMMARY

A power control apparatus can include a power circuit configured to transfer power to a load circuit. The apparatus can also include one or more environmental sensors configured to register environmental data including at least one of movement, hazardous gas, environmental temperature, environmental moisture, collision data, cable integrity, compression, or the like associated with the apparatus. The example, sensors can monitor power cable continuity or deformation, i.e. exceeding a threshold bend radius or stretching tolerances, compression events, or the like. The apparatus can also include a power controller circuit operatively connected to the one or more environmental sensors and the power circuit, the power controller circuit being configured to receive the environmental data from the one or more environmental sensors, determine whether the received environmental data exceeds a predetermined threshold, and in response to determining that the received environmental data exceeded a predetermined threshold, interrupt supply of power from the power circuit to the load circuit.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

Features and advantages of example embodiments will be apparent from the detailed description which follows, taken in conjunction with the accompanying drawings, which together illustrate, by way of example, features; and, wherein.

Reference will now be made to the exemplary embodiments illustrated, and specific language will be used herein to describe the same. It will nevertheless be understood that no limitation on scope is thereby intended. These drawings are provided to illustrate various aspects of the invention and are not intended to be limiting of the scope in terms of dimensions, materials, configurations, arrangements or proportions unless otherwise limited by the claims.

DETAILED DESCRIPTION

Before various technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to convey a thorough understanding of various technology embodiments. One skilled in the relevant art will recognize, however, that such detailed embodiments do not limit the overall technological concepts articulated herein, but are merely representative thereof.

As used in this written description, the singular forms "a," "an" and "the" include express support for plural referents unless the context clearly dictates otherwise. Thus, for example, reference to "a" layer includes a plurality of such layers.

Reference throughout this specification to "an example" means that a particular feature, structure, or characteristic described in connection with the example is included in at least one technology embodiment. Thus, appearances of the phrases "in an example" or "in an embodiment" in various places throughout this specification are not necessarily all referring to the same embodiment.

As used herein, the term "at least one of" is intended to be synonymous with "one or more of." For example, "at least one of A, B and C" explicitly includes only A, only B, only C, and combinations of each.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as de facto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the disclosed technology. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "higher," "lower," "enhanced," "minimized," "maximized," "increased," "reduced," and the like refer to a property of a device, component, function, or activity that is measurably different from other devices, components, or activities in a surrounding or adjacent area, in a single device or in multiple comparable devices, in a group or class, in multiple groups or classes, related or similar processes or functions, or as compared to the known state of the art.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases, depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

The term "coupled," as used herein, is defined as directly or indirectly connected in an electrical or nonelectrical manner. "Directly coupled" items or objects are in physical contact and attached to one another. Objects or elements described herein as being "adjacent to" each other may be in physical contact with each other, in close proximity to each other, or in the same general region or area as each other, as appropriate for the context in which the phrase is used.

Numerical amounts and data may be expressed or presented herein in a range format. It is to be understood, that such a range format is used merely for convenience and brevity, and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Embodiments of the present technology are directed toward hazard detection systems for portable electrical devices. In one embodiment, a hazard detection system is included in an electrical device. The electrical device includes a power circuit that is configured to provide power to a load circuit. The power source may be located remotely from the power circuit and connected to the power circuit via a cable. In other example embodiments, the power source can be integrated into the electrical device itself (e.g., a battery).

The electrical device includes one or more environmental sensors. The sensors can be configured to register data about the environment of the electrical device and data about movement of the electrical device (including but not limited to acceleration of the electrical device or damage to the structure of the device). These sensors can continuously record data from the environment and the electrical device. In some embodiments, the environmental sensors are configured to register environmental data values for a variety of environmental values including values for at least one of acceleration of the electrical device, the presence or absence of hazardous or inflammatory gases, environmental temperature, environmental moisture, cable integrity (e.g. continuity, compression, etc), and collision data associated with the apparatus. Similarly, electrical variations (i.e. surface ESD), magnetic signal thresholds, pressure changes, vibrational frequencies (sound), electromagnetic (light, radio frequencies, etc.), isotopic sensors, positional sensors can be used. The hazard detection system can also store predetermined threshold values for each of the registered environmental values. Thus, when an environmental value is registered, the hazard detection system can compare the registered environmental value to the predetermined threshold value. Registration of environmental values can occur by at least one of periodic polling of the sensors, active reporting by the sensors, or the like.

In one example, accelerometer data can be subject to a minimum sample rate in order to guarantee a minimum target precision. Furthermore, the system can optionally include a human machine interface (HMI) which communicates registered values to a human operator.

In some example embodiments, if the hazard detection system determines that at least one registered value exceeds the predetermined threshold for that value, the supply of power from the power circuit to the load circuit can be interrupted. In this way, the chance of electrical sparking or arcing occurring can be minimized. For example, if the electrical device is a light, the hazard detection system incorporated into the light can detect an abrupt change in acceleration caused when that light is dropped. The hazard detection system can then interrupt supply of power to the lighting circuit before any structural damage causes arcing or sparking conditions. An acceleration sensor such as, but not limited to, ADXL335 triple axis accelerometer, and the like can be used to measure acceleration and report abrupt changes in acceleration associated with an impact or drop. For example, abrupt acceleration changes of greater than 9.5 m/s$^2$ can indicate a hazardous drop has occurred and inspection and/or replacement of the device should occur.

In some examples, the predetermined threshold value can be adjusted based on other environmental values. For example, if a gas sensor detects a high concentration of a potentially explosive gas, the threshold value for acceleration or impact can be adjusted down to provide more safety from a potential spark or arc. For example, a predetermined threshold can be a set for methane gas concentrations above 45,000 ppm, where 50,000 ppm methane is considered potentially explosive.

Similarly, a temperature sensor can be used to identify temperature extremes which could result in damage to the device. Extreme cold and extreme hot temperature can affect performance and safety of electronic devices, depending on the device. For example, temperatures above about 100° C. may compromise integrity of many housing materials, seals, and electronics. Additionally, abrupt changes in temperature can cause materials to fail such that temperature sensors can also report rates of change in temperature. Non-limiting examples of suitable temperature sensors can include thermocouples, thermistors, thermostat, resistance temperature detectors, and the like.

Moisture sensors can be any sensor which detects values or thresholds of moisture in an environment. Non-limiting examples of moisture sensors can include capacitive sensors, resistive sensors, thermal sensors, other hygrometer designs, and the like. As a general rule, humidity levels in excess of about 60% can present hazardous moisture condensation conditions, which can result in short circuits, equipment breakdown, and possible electrocution. Further, at specified thresholds of environmental moisture, humidity controls may be engaged to prevent operation of equipment, and to reduce condensation by increasing air flow or by elevating heat to dry equipment for safe usage.

In some examples, the interruption of power is temporary. In these examples, the threshold value for a sensor is exceeded and the power is temporarily interrupted. The hazard detection system can then continue to monitor the values for a period of time. If, during the period of time, the sensor values do not exceed the threshold, the power supply can be restored. As in the above examples, if a light device is dropped, a sensor that detects acceleration can detect an acceleration value above a threshold value and temporarily interrupt the supply of power to the load circuit (e.g., the lighting circuit). The hazard detection system can then continue to monitor the value of the acceleration sensor in the lighting device for a given period of time. If, for example, the lighting device is caught before hitting a hard surface (e.g., a safety wire prevents it from falling to the ground) the measured acceleration will not exceed the threshold value during that time, and the supply of power can be restored. In this way, the electrical device can enable quick shutdown of power without permanently or semi-permanently disconnecting the supply of power. Alternatively, power can be restored via a manual reset switch after a user has an opportunity to inspect, test and otherwise confirm safe operation of the device.

The power control apparatus can generally be enclosed within a housing. The housing can provide protection from debris, mechanical damage, etc. Any suitable housing material can be used such as, but not limited to, metal, rigid polymer, rubberized polymer, composites, alloys, and the like. In some cases the housing can include a combination of rigid housing walls with rubberized corners and edges. For example, a polyurethane polymer can be used to provide a cushioned outer profile to outer surfaces which are likely to encounter impacts during use.

The disclosed technology can significantly reduce danger associated with unwanted sparking or arcing of electrical power in dangerous environments. As a result, the total cost of operating electrical devices in hazardous environments is reduced.

Figure 1:
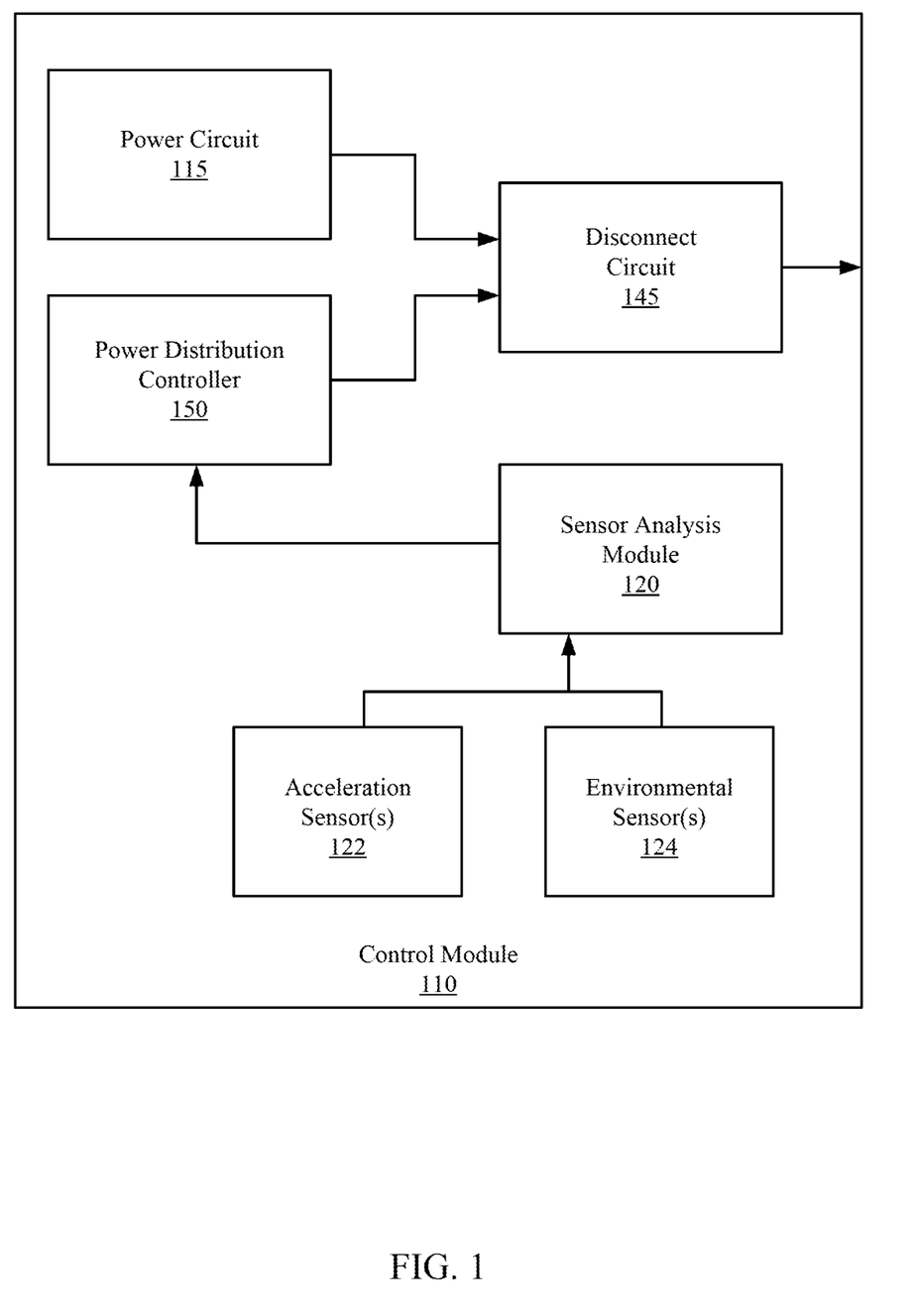
FIG. 1 shows a control module of a power control apparatus in accordance with an example.

FIG. 1 shows a control module of a power control apparatus in accordance with an example. The control module 110 can include a power circuit 115, a power distribution controller 150, a disconnect circuit 145, one or more acceleration sensors 122, one or more environmental sensors, 124, and a sensor analysis module 120. Although not pictured in FIG. 1, in some examples, the control module 110 can be connected to a power supply that connects to the rest of the control module 110 via the power circuit 115.

As noted above, the power circuit 115 can be configured to control the flow and direction of electrical power from a power source (e.g., wall outlet, battery, generator, or other electrical current source) to a load circuit via a disconnect circuit 145. In some examples, the power circuit 115 is a power management integrated circuit. The power circuit 115 can also perform functions such as DC to DC conversion, power-source selection, voltage scaling, power sequencing, and the like.

In some examples, the power distribution controller 150 is configured to, with the power circuit 115, regulate and provide power to a load circuit. Although the power circuit 115 and the power distribution controller 150 are displayed as distinct reference objects, the power distribution controller 150 can be included in the power circuit 115. In some example embodiments, the power distribution controller 150 can receive signals from the sensor analysis module 120.

In one alternative, the system can be designed with a back-up battery circuit that allows the control module to remove the input power as well as disable the load. Optional shunting circuitry can be included, such that the output and the input can be held at 0 voltage potential. As a result, if the input is connected to a circuit breaker, the control module will actively trigger the circuit breaker such that electricity is disconnected at the source as well as being disconnected at the device and the load. Additionally, in some situations the disconnect circuitry can be triggered by a computer system, for example, by receiving the data from the environmental sensors and using alternative control algorithms to disconnect power as needed.

In some examples, the sensor analysis module 120 receives environmental data from a plurality of sensors. The plurality of sensors can include, but is not limited to, acceleration sensors 122 and environmental sensors 124. In some examples, the acceleration sensors 122 comprise one or more accelerometers. The accelerometer allows the sensors to measure rate of change in a velocity of the control unit in which the sensor is included. Thus, if the control module is increasing in velocity (speeding up) or decreasing in velocity (slowing down) the acceleration sensors 122 can capture such acceleration data. This acceleration data can then be provided to the sensor analysis module which determines rates of change in acceleration and makes a comparison to predetermined thresholds.

In one additional alternative, a pre-load sensor can be operatively connected between a supply of power and the load circuit. The pre-load sensor can monitor conditions prior to power up (e.g. power delivery to a load circuit) in order to avoid operation of a device under unsafe conditions. For example, the pre-load sensor can detect a correct reference signal, line voltage, current, phase, or other input power characteristics are within a predetermined acceptable operational limit (e.g. according to compliance standards or device load specifications). Such a pre-load sensor can prevent operation of the device under conditions that might result in an electric discharge, thermal event, unauthorized operation, etc.

In some examples, the acceleration sensors can be configured to detect multi-directional acceleration. For example, a set of three orthogonally oriented acceleration sensors can be used to detect variations in acceleration in three-dimensions. Thus, if an electrical device is rotating or falling in an arc, the acceleration sensors 122 can be configured to register the acceleration even though it is not a vertical drop. For example, an electrical device may start off falling vertically and then, due to a connected extension cord or safety line, change directions and hit a wall. Thus, multidirectional acceleration can also be a useful input to determine environmental impacts.

In addition, the acceleration sensors 122 can also include sensors designed to measure structural damage to the electrical device, including, but not limited to, measuring the breaking of glass upon impact, measuring any interruption in the power circuit, and so on). For example, the acceleration sensors 122 can include an impact switch, the impact switch configured specifically to measure an impact on the electrical device. For example, such sensors can include audio, vibration, or conductive mechanisms which trigger a response under impact, motion or vibration conditions which could compromise the device. In the case of audio, a specific frequency of broken glass is detected, which triggers a response. These audio sensors can be mounted to the PCB or electrically connected to the sensor analysis module. Similarly, a vibration sensor, e.g. mounted on the glass surface, can trigger a response if an impact vibration is detected on the surface. Third, conductive film(s) can be incorporated on the glass, within laminated glass, or on the body or housing of the light. An alteration to measured conductivity is detected can indicate that a break in the field has occurred, which could be broken glass or crack in the body of the tool. Similarly, micro-thin conductive filaments can be incorporated into the glass as conductive wires which can detect a break when continuity is lost (e.g. filament wire is broken). These same sensors can also be effectively used for any transparent window panel (e.g. glass, polymer, etc). A deflection sensor can also detect physical deformation of the housing. For example, deflection beyond a predetermined percentage can indicate the housing is no longer structurally sound. Deflection sensors can include piezoelectric or other flex sensors.

In some examples, the environmental sensors 124 are configured to register a plurality of different environmental data including, but not limited to the presence and/or concentration of hazardous gases, the environmental temperature, the presence or lack of environmental moisture, dust, or other combustible materials. In one example, an environmental sensor can include a hydration/water sensor. In some applications, device immersion in water can be desirable for operation (e.g. high temperature operation). In another example, a gas sensor can detect at least one of methane, hydrogen, and hydrocarbons inside or adjacent to the device which may present flammable or explosive conditions. In yet another example, thermal sensors can be used to confirm proper safe operating temperatures are met during use of the device (e.g. tool may be designed for use in a freezer, furnace, or other extreme environment). In still another example, smoke sensors can identify presence and/or characteristics of smoke. For example, presence of smoke may indicate an undesirable operating environment which would trigger shutdown. Alternatively, a smoke sensor can further include a light frequency detector which can correlate color temperature of smoke with light transmission and visibility conditions (e.g. firefighter operation of the device in smoke-filled environments). Light sensors can be used to detect desirable frequency and intensity of light for a given environment and application. Further, pressure sensors can measure environmental pressure and compare to designed operating pressure criteria (e.g. operation in the ocean versus space). Magnetic sensors can be used to determine whether a tool is engaged with a magnetic surface prior to or during operation (e.g. secure position, additional heat sink, etc). Such magnetic sensors can also be used to disable tools when they are in proximity to other tools, or to enable tools when they are magnetically coupled together. Wireless sensors can also be used to facilitate wireless connectivity with other devices or components (e.g. a control board, other tools, cellular functionality, weather monitoring, etc). In one alternative, the control module can be wirelessly connected to receive hazard warnings which could compromise safe operation of an automated tool. For example, an approaching hurricane, wild fires, etc. may create approaching hazardous conditions which would trigger disconnection of power to the device. Wireless sensors can include any wireless communication protocol such as, but not limited to, RFID, Bluetooth, WiFi, cellular, and the like.

In some example embodiments, the sensor analysis module 120 stores pre-determined threshold values for the various environmental data types that may be received from the acceleration sensors 122 and the environmental sensors 124. For example, the predetermined threshold value for acceleration can be 9.81 m/s$^2$ (approximately the acceleration of an object in free fall.) If the acceleration sensor reaches this threshold value, the sensor analysis module 120 can notify the power distribution controller 150 that a threshold value has been exceeded.

In response to receiving a notification that one or more sensor values has exceeded a predetermined threshold value, the power distribution controller 150 instructs the disconnect circuit 145 to interrupt power supply from the power circuit 115 to the load circuit (not pictured). In this way, the control module 110 safely interrupts the transmission of power prior to, or contemporaneous with, the possibility of arcing or sparking caused by adverse environmental conditions or damage to the electrical device itself.

In other example embodiments, the power distribution controller 150 can instruct the disconnect circuit 145 to temporarily interrupt power transmission and simultaneously instruct the sensor analysis module 120 to continue monitoring the plurality of sensors after the interruption of power. The sensor analysis module 120 then continues to compare registered values to threshold values. In some examples, the threshold values that are compared against after the interruption of power transmission are different that the threshold values used before the interruption of power. If the registered values do not exceed the threshold during the period of time, the power distribution controller 150 instructs the disconnect circuit 145 to resume transmission of power to the load circuit. For example, power may be restored after a methane gas concentration falls below a predetermined safe value for a time greater than one minute. Other variables and restoration time delays can be set based on best practices and individual device factors. For example, immersion in water can either activate or deactivate the device depending on intended operating conditions. Similarly, pressure conditions outside of intended safe operating pressures can also disable the device. In another alternative, a cable stretch sensor can be included to measure elongation of a cable which exceeds safety conditions (e.g. result in cable failure, cable connector failure, etc).

In another example, the electrical device can be configured such that a first group of sensors is used to initially interrupt the power and a second group of sensors is used to determine whether power should be restored. For example, if the power distribution controller 150 initially receives acceleration data above a safety threshold, the power distribution controller can rely on the impact switch to determine whether the electrical device actually impacts a hard surface. In yet another example, certain devices may be safe to drop in water. Thus, after the power is initially interrupted, if the power distribution controller 150 determines that the electrical device lands in water, the power supply can be restored or power is not interrupted. In another alternative, interruption of power can be triggered upon meeting multiple thresholds. For example, a motion sensor can cause disconnection of power upon detection of a free fall event and then upon measuring a zero acceleration compare peak energy absorption with a predetermined safety limit. If the safety limit was not reached (e.g. via an impact of sufficient energy), power can be restored to the device.

Figure 2:
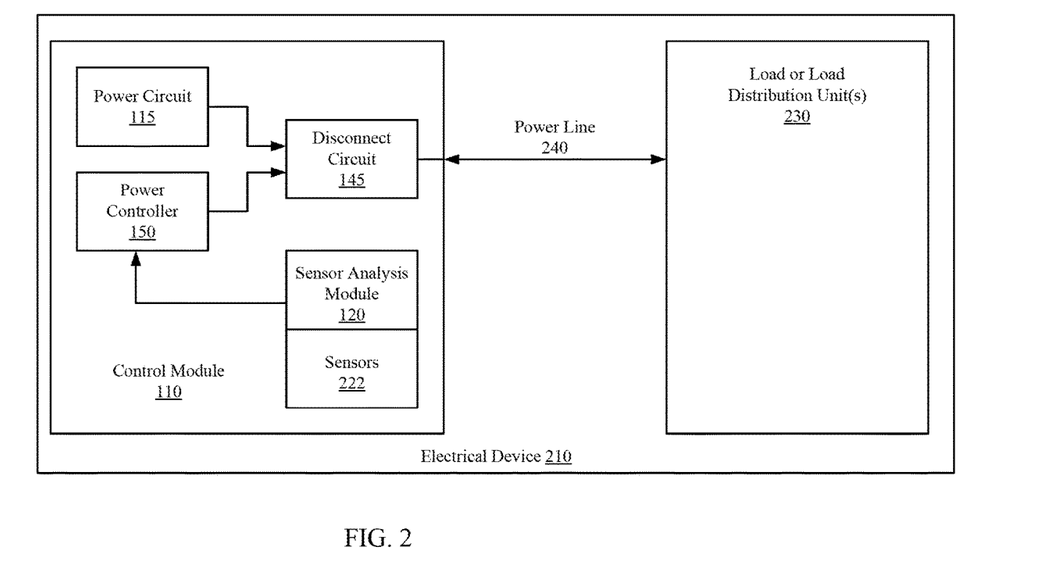
FIG. 2 shows an electrical device in accordance with an example.

FIG. 2 shows an electrical device 210 in accordance with an example. The electrical device includes a control module 110 and a load or load distribution unit 230 (hereinafter "load unit 230"). The control module 110 includes a power circuit 115, a power controller 150, a plurality of sensors 222, a sensor analysis module 120, and a disconnect circuit 145. As noted above with respect to FIG. 1, the plurality of sensors 222 can include one or more of an accelerometer, a gas sensor, a temperature sensor, an impact switch, and a moisture sensor.

The sensor analysis module 120 can compare data values registered by the plurality of sensors 222 against predetermined threshold values. As noted above, if one or more registered values exceeds its associated predetermined threshold, the sensor analysis module 120 will notify the power controller 150. In response, the power controller 150 can instruct the disconnect circuit 145 to interrupt power supply of power from the power circuit to the load units 230.

In some examples, the control module 110 can be configured to connect the power circuit 115 to the load unit 230 via power line 240. In some examples, the power line connects the disconnect circuit to the load unit 230 and as such, when the disconnect circuit 145 interrupts power transmission to the power line 240, the load unit 230 no longer has access to power.

In some examples, the load unit performs the task associated with the electrical device 210. For example, the electrical device 210 can be one of a portable lighting device, a mountable area lighting device, a head mounted lighting device, a power tool, or any other powered device that can be used in potentially hazardous environments. In some alternatives, the control can include a secondary battery to maintain power to the analysis module so as to allow operation of disconnection and connection to the power supply.

Figure 3:
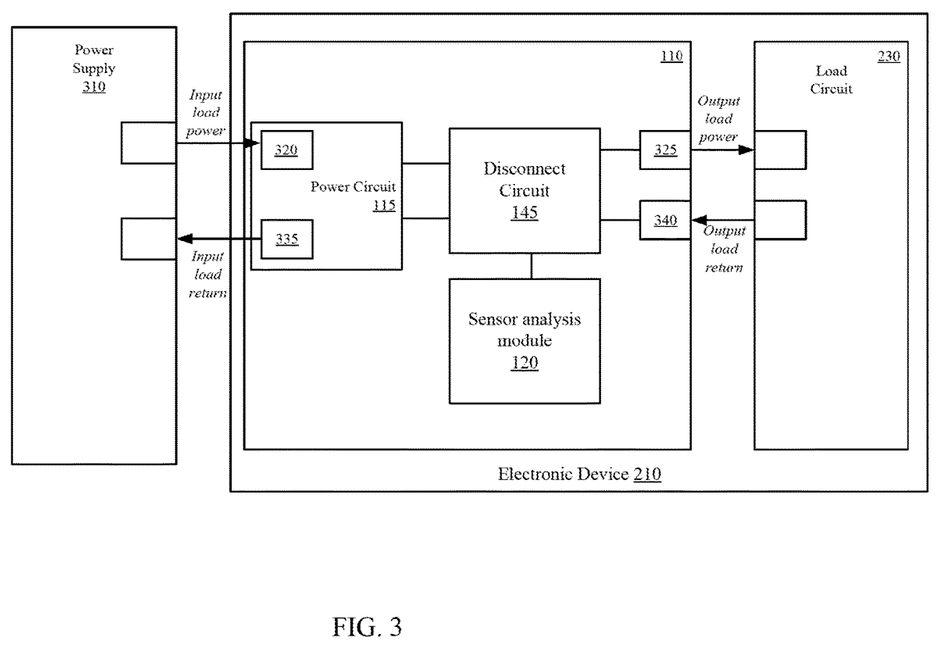
FIG. 3 shows an electrical device with an associated power supply in accordance with an example.

FIG. 3 shows an electrical device 210 with an associated power supply in accordance with an example. As above, the electrical device includes a control module 110 and a load or load distribution unit 230 (hereinafter "load unit 230"). The control module 110 includes a power circuit 115, a sensor analysis module 120, and a disconnect circuit 145.

The control circuit 110 can provide for coupling the power circuit 115 to the one or more load circuits 230 once the one or more load circuits 230 and the power circuit 115 are both coupled to the disconnect circuit 145, and disconnects the power circuit 115 from the one or more load circuits 230 if disconnect circuit 145, in response to direction from the sensor analysis module 120, interrupts power supply from the power circuit 115 to the load circuit 230.

In one aspect, the power circuit 115 can be configured to electrically un-couple an input load power terminal 320 from an output load power terminal 335 and electrically un-couple an input load return terminal 325 from an output load return terminal 340 of the control module 110, when the power circuit 115 is supplying an 'off' voltage to the load circuit 230. Optionally, the power circuit 115 can also be configured to electrically couple the output load power terminal 335 to a chassis ground. In this aspect, the input terminals 432, 335, are electrically un-coupled from the output terminals 325, 340, when the disconnect circuit 145 interrupts supply of power from the power supply 310 and therefore supplying an 'off' voltage.

Figure 4:
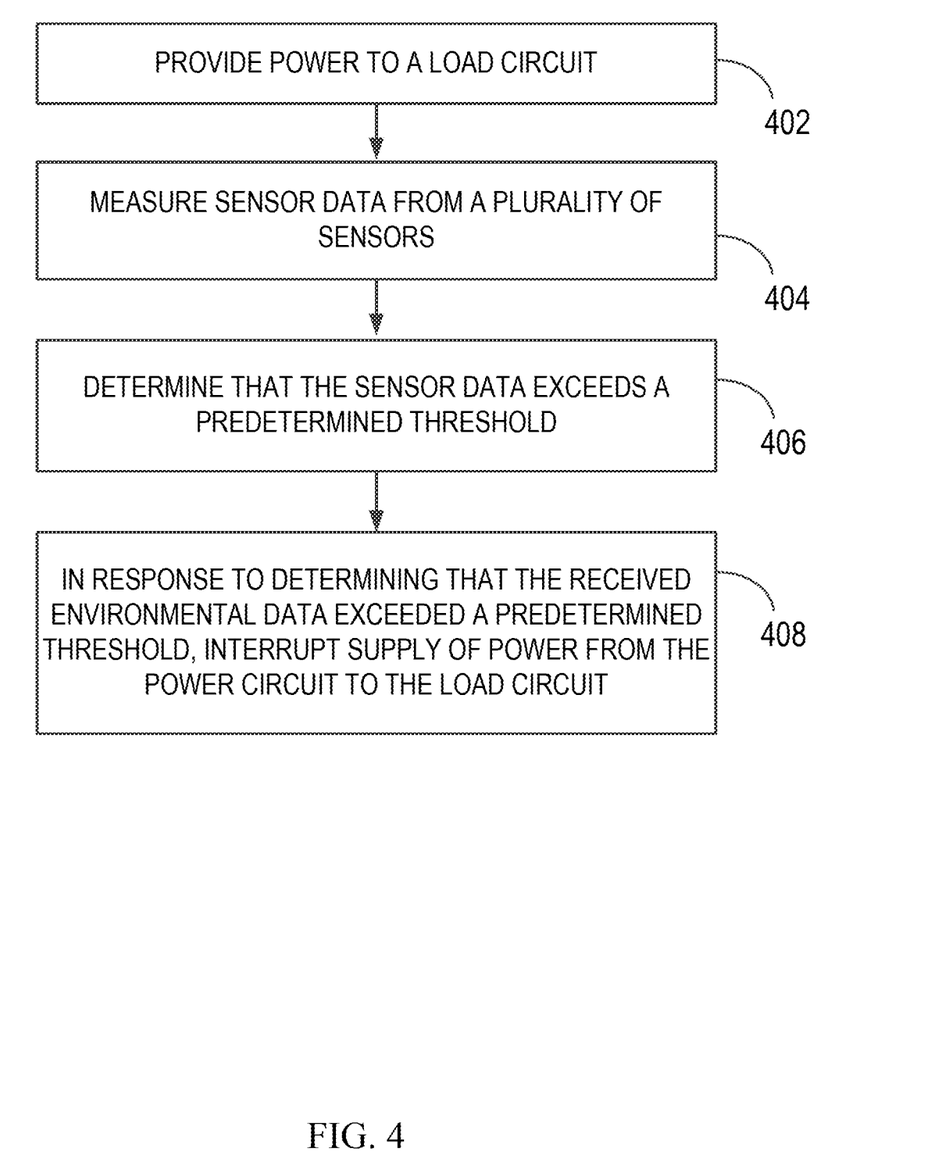
FIG. 4 is an example flow chart for a method of operating a hazard detection system in accordance with some embodiments.

FIG. 4 is an example flow chart for a method of operating a hazard detection system in accordance with some embodiments. In this method, a hazard detection system provides 402 power to a load circuit. As noted above, the load circuit can be integrated into one of a portable lighting device, a mountable area lighting device, a head mounted lighting device, and so on. In some examples, the hazard detection system is electrically coupled to a power supply.

In some examples, the hazard detection system measures 404 sensor data from a plurality of sensors. As noted above, the plurality of sensors can include one or more of one or more of an accelerometer, a gas sensor, a temperature sensor (e.g., thermometer), an impact switch, and a moisture sensor. Each sensor registers a specific type of environmental data and relays those values to a sensor analysis module 120.

In some examples, the sensor analysis module compares the received values against pre-established safety threshold values for each type of environmental data to determine whether a predetermined threshold has been exceeded 406. In some examples, the pre-established values are set at the time of manufacture. In other example embodiments, the pre-established threshold values can be manually set by the user according to specific needs of a particular environment or situation. In other example embodiments, the threshold values can be modified based on one or more other environmental values. For example, if a gas sensor detects a modestly high level of combustible gas which alone may not justify interruption of power, other threshold values may be lowered to compensate for the increased danger.

In some examples, in response to determining that the received environmental data exceeded a predetermined threshold 406, the sensor analysis module causes the power circuit to interrupt supply of power from the power circuit to the load circuit 408. In this way, the hazard detection system is able to shut off power as soon as possible in potentially dangerous environments and circumstances.

Figure 5:
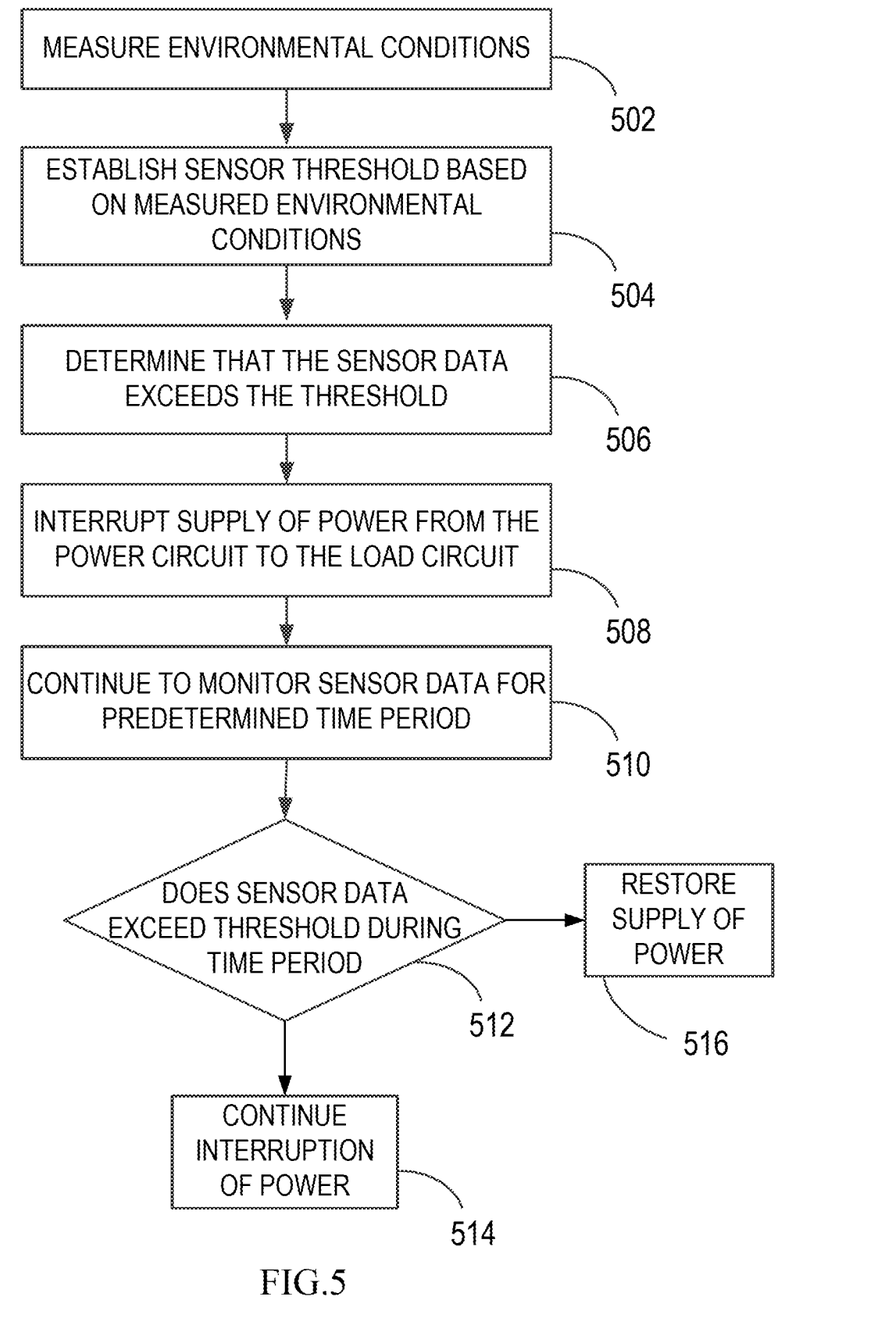
FIG. 5 is an example flow chart for a method of operating a hazard detection system in accordance with some embodiments.

FIG. 5 is an example flow chart for a method of operating a hazard detection system in accordance with some embodiments. In this method, a hazard detection system measures 502 environmental conditions for a particular electrical device. As noted above, the environmental conditions are measured by a plurality of sensors. The plurality of sensors can include one or more of one or more of an accelerometer, a gas sensor, a temperature sensor (e.g., thermometer), and a moisture sensor. Each sensor registers a specific type of environmental data and relays those values to a sensor analysis module.

In some examples, the sensor analysis module establishes sensor thresholds based on the measured environmental conditions. In some examples, a safer environment can allow for certain thresholds to be increased, based on the environmental conditions. For example, a safe temperature limit may be increased if dust and gas concentration levels are relatively low (as determined by a specific gas or environment and established standards). In contrast, in dangerous conditions (e.g., gases, dust, high temperatures, excess moisture), the sensor thresholds can be reduced, such that the thresholds are more easily met during use. As one specific example, a light device equipped with a gas sensor may detect that it is operating in an environment of kerosene, which has a temperature classification of T3, requiring the light not to exceed 200° C. on its body. As such, the sensor can effectuate an operating output to ensure 200° C. body temperature is not exceeded. This same light, can also be used in a methane environment, which has a temperature classification of T1, requiring the light not to exceed 450° C. on its body. Thus, the operating output could be increased via adjustment of the operating temperature limit, allowing the light body to increase beyond the 200° C. body temperature required for kerosene.

In some examples, the sensor analysis module compares the measured environmental conditions to the threshold values. In accordance with a determination that the sensor data values exceed 506 the threshold values, the power circuit interrupts 508 supply of power from the power circuit to the load circuit.

Once the power has been interrupted, the sensor analysis module can continue to monitor 510 sensor data for a predetermined period of time. The sensor analysis module can then determine whether the sensor data exceeds the threshold during a given time period 512. In accordance with a determination that the sensor data does not exceed the threshold during the given time period, the power circuit can restore supply of power to the load circuit 516. Similarly, in accordance with a determination that the sensor data exceeds the threshold during the given time period, the power circuit continues the interruption of power to the load circuit 514.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A lighting device comprising:
a light circuit;
a housing enclosing the light circuit, the housing being operable to protect the light circuit against initiating an explosion in a hazardous environment; and
a power control apparatus operably coupled to the light circuit, the power control apparatus having
a power circuit configured to transfer power to the light circuit;
one or more environmental sensors configured to register environmental data including at least one of movement, hazardous gas, environmental temperature, environmental moisture, and collision data associated with the lighting device; and
a power controller circuit operatively connected to the one or more environmental sensors and the power circuit, the power controller circuit being configured to:
receive the environmental data from the one or more environmental sensors;
determine whether the received environmental data exceeds a predetermined threshold selected to identify potential structural damage to the lighting device sufficient to cause an arcing or a sparking condition in the light circuit; and
in response to determining that the received environmental data exceeded the predetermined threshold, interrupting supply of power from the power circuit to the light circuit.

2. The lighting device of claim 1, wherein the one or more environmental sensors include a first sensor configured to register movement data and a second sensor configured to register environmental data.

3. The lighting device of claim 2, wherein the first sensor is an accelerometer and the movement data is acceleration.

4. The lighting device of claim 3, wherein the movement data is monitored over a predetermined period of time and power is interrupted when a maximum safe acceleration threshold is exceeded for longer than a minimum safe time.

5. The lighting device of claim 4, wherein the maximum safe acceleration threshold is at least 1 G and the minimum safe time is at least 600 msec.

6. The lighting device of claim 2, wherein the second sensor is at least one of a gas sensor, a temperature sensor, a moisture sensor, and a cable integrity sensor.

7. The lighting device of claim 2, further comprising a third sensor configured to detect structural damage to the power control apparatus.

8. The lighting device of claim 7, wherein the third sensor is a glass impact sensor configured to detect glass breaking.

9. The lighting device of claim 2, wherein interrupting supply of power from the power circuit to the light circuit is temporary.

10. The lighting device of claim 9, wherein the power controller circuit is further configured
while the supply of power from the power circuit to the light load circuit is temporarily interrupted to:
continue to monitor movement data for a predetermined period of time;
determine whether the movement data exceeds a second predetermined threshold within the predetermined period of time;
in accordance with a determination that the movement data does not exceed the second predetermined threshold within the predetermined period of time, restore the supply of power from the power circuit to the light circuit.

11. The lighting device of claim 1, further comprising a pre-load sensor operatively connected to the power circuit and configured to prevent the supply of power from reaching the light circuit upon start-up when at least one input power characteristic of the supply of power is not within a predetermined acceptable operational limit.

12. The lighting device of claim 1, wherein the lighting device is at least one of a portable lighting device, a mountable area lighting device, or a head mounted lighting device.

13. The lighting device of claim 1, wherein the housing is covered at least partially with a rubberized polymer.

14. The lighting device of claim 1, wherein the power controller circuit is further configured to:
adjust the predetermined threshold based on current environmental data.

15. A method for controlling power in a lighting device to prevent an explosion in a hazardous environment, the method comprising:
providing power from a power circuit to a light circuit, the light circuit being enclosed within a housing of the lighting device, the housing being operable to protect the light circuit against initiating an explosion in a hazardous environment;
registering environmental data associated with the lighting device using one or more sensors;
determining whether the registered environmental data exceeds a predetermined threshold
selected to identify potential structural damage to the lighting device sufficient to cause an
arcing or a sparking condition in the light circuit; and
in response to determining that the registered environmental data exceeded the predetermined threshold, interrupting supply of power from the power circuit to the light circuit.

16. The method of claim 15, wherein the one or more sensors include a first sensor configured to register movement data and a second sensor configured to register environmental data.

17. The method of claim 16, wherein the second sensor is at least one of a gas sensor, a temperature sensor, or a moisture sensor.

18. The method of claim 16, wherein the one or more sensors include a third sensor configured to detect structural damage to the lighting device.

19. The method of claim 18, wherein the third sensor is a glass impact sensor configured to detect glass breaking.

20. The method of claim 16, wherein the movement data is monitored over a predetermined period of time and power is interrupted when a maximum safe acceleration threshold is exceeded for longer than a minimum safe time.

21. The method of claim 20, wherein the maximum safe acceleration threshold is at least 1 G and the minimum safe time is at least 600 msec.

22. The method of claim 16, wherein interrupting supply of power from the power circuit to the light circuit is temporary.

23. The method of claim 22, the method further comprising:
while the supply of power from the power circuit to the light circuit is temporarily interrupted to:
monitor movement data for a predetermined period of time;
determine whether the movement data exceeds a second predetermined threshold within the predetermined period of time;
in accordance with a determination that the movement data does not exceed the second predetermined threshold within the predetermined period of time, restore the supply of power from the power circuit to the light circuit.

24. The method of claim 16, wherein the first sensor is an accelerometer.

* * * * *